(12) United States Patent
Suzuki

(10) Patent No.: US 7,380,990 B2
(45) Date of Patent: Jun. 3, 2008

(54) BEARING, BEARING MECHANISM, AND PLUNGER PUMP

(75) Inventor: Masakuni Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 274 days.

(21) Appl. No.: 11/289,438

(22) Filed: Nov. 30, 2005

(65) Prior Publication Data

US 2006/0120646 A1    Jun. 8, 2006

(30) Foreign Application Priority Data

Dec. 3, 2004   (JP)   ............... 2004-351227

(51) Int. Cl.
*F16C 33/66* (2006.01)
*F16C 33/46* (2006.01)

(52) U.S. Cl. .................. 384/472; 384/470; 384/523

(58) Field of Classification Search ........ 384/470–473, 384/523, 572
See application file for complete search history.

(56) References Cited

U.S. PATENT DOCUMENTS

| 2,849,262 | A |   | 8/1958 | Wood et al. |   |
|---|---|---|---|---|---|
| 4,192,560 | A |   | 3/1980 | Hartnett |   |
| 4,345,799 | A |   | 8/1982 | Crofts |   |
| 4,915,515 | A | * | 4/1990 | Rohrer et al. | 384/465 |
| 6,890,105 | B2 | * | 5/2005 | Ide et al. | 384/470 |
| 2002/0009244 | A1 | * | 1/2002 | Temme | 384/447 |

FOREIGN PATENT DOCUMENTS

| CH | 122 137 | 9/1927 |
|---|---|---|
| CN | 1451892 A | 10/2003 |
| DE | 1 575 500 | 1/1970 |
| DE | 42 14 987 A1 | 11/1992 |
| DE | 44 41 237 A1 | 7/1995 |
| DE | 103 09 828 A1 | 9/2004 |
| EP | 0 420 312 A1 | 4/1991 |
| GB | 1 175 109 | 12/1969 |
| GB | 1 355 949 | 6/1974 |
| GB | 1 408 159 | 10/1975 |
| JP | A 02-146310 | 6/1990 |
| JP | U-5-83372 | 11/1993 |
| JP | A 06-093964 | 4/1994 |
| JP | A 09-017764 | 1/1997 |
| JP | A 2001-263257 | 9/2001 |
| JP | A-2003-056576 | 2/2003 |
| JP | A 2003-097546 | 4/2003 |

* cited by examiner

*Primary Examiner*—Thomas R Hannon
(74) *Attorney, Agent, or Firm*—Oliff & Berridge, PLC

(57) ABSTRACT

A bearing comprises a cage which is provided on a circumference of a rotary shaft to hold elements rotating in an oil. A guide unit is provided on the cage to feed the oil in an axial direction or a radial direction of the rotary shaft.

5 Claims, 4 Drawing Sheets

BEARING, BEARING MECHANISM, AND PLUNGER PUMP

BACKGROUND OF THE INVENTION

1. Field of the Invention

The present invention relates to a bearing, a bearing mechanism, and a plunger pump in which the reliability is raised.

2. Description of the Related Art

Conventionally, a plunger pump which comprises an eccentric cam, a bearing, and a pair of plungers is known. In this plunger pump, the eccentric cam is rotated by a motor. The bearing is arranged on the circumference of the eccentric cam and held on the eccentric cam. The plungers are brought in contact with the eccentric cam during the rotation of the eccentric cam so that the plungers are reciprocated. For example, see Japanese Laid-Open Patent Application No. 06-093964.

In the bearing mechanism of the above-mentioned plunger pump, the oil of the bearing is flown to the side of the outer race side due to the centrifugal force of the eccentric cam, and a negative pressure arises on the inner race side.

With the negative pressure, the air contained in the oil is turned into air bubbles, and the air bubbles appear in the oil. With an increase of the temperature, the volume of the air bubbles in the oil expands.

In such circumstances, the oil film with an appropriate thickness for the bearing is not formed, which may place the bearing in an overheating condition and may cause deterioration of the durability of the bearing.

Moreover, when the above-mentioned conventional plunger pump is carried on a control brake device, the oil with the air-bubbles contained is mixed with the working fluid of the control brake device, which may cause a malfunction of the control brake device to take place.

SUMMARY OF THE INVENTION

An object of the present invention is to provide an improved bearing device in which the above-mentioned problems are eliminated.

Another object of the present invention is to provide a bearing, a bearing mechanism, and a plunger pump in which the reliability is raised.

In order to achieve the above-mentioned objects, the present invention provides a bearing comprising: a cage provided on a circumference of a shaft to hold rolling elements which are rotatable in an oil around the circumference of the shaft; and a guide unit provided on the cage to feed the oil of the bearing in an axial direction or a radial direction of the shaft when the shaft is rotated.

The above-mentioned bearing of the invention may be configured so that the guide unit comprises fin portions which are provided on the cage to feed the oil of the bearing in the axial direction or the radial direction of the shaft when the shaft is rotated.

In order to achieve the above-mentioned objects, the present invention provides a bearing mechanism including a shaft provided on a housing, a bearing provided on a circumference of the shaft, and a rotating member provided on the circumference of the shaft, wherein the bearing comprising: a cage provided on the circumference of the shaft to hold rolling elements which are rotatable in an oil around the circumference of the shaft; and a guide unit provided on the cage and/or the rotating member to feed the oil of the bearing in an axial direction or a radial direction of the shaft when the shaft is rotated.

The above-mentioned bearing mechanism of the invention may be configured so that the rotating member is a balancer which comprises first convex portions provided thereon to feed the oil in a direction toward the bearing when the shaft is rotated.

The above-mentioned bearing mechanism of the invention may be configured so that the cage of the bearing comprises second convex portions provided on the cage to feed the oil in the axial direction or the radial direction of the shaft when the shaft is rotated.

The above-mentioned bearing mechanism of the invention may be configured so that the bearing is a ball bearing or a needle bearing.

The above-mentioned bearing mechanism of the invention may be configured so that a pair of ball bearings are disposed on the circumference of the shaft at both ends of the shaft, a pair of balancers are disposed between the pair of ball bearings on the circumference of the shaft, and a needle bearing is disposed between the pair of balancers on the circumference of the shaft.

In order to achieve the above-mentioned objects, the present invention provides a plunger pump including a plunger, a bearing mechanism, and a pump chamber, the bearing mechanism including a shaft provided on a housing, a first bearing and a second bearing provided on a circumference of the shaft, and a rotating member provided on the circumference of the shaft, the plunger being brought in contact with the second bearing and reciprocated with an eccentricity of the second bearing to suck an oil from a suction passage into the pump chamber and discharge the oil of the pump chamber to a discharge passage by the reciprocating motion of the plunger, wherein the bearing mechanism comprises: a cage provided on the circumference of the shaft to hold rolling elements which are rotatable in an oil around the circumference of the shaft; and a guide unit provided on the cage and/or the rotating member to feed the oil of the first bearing in an axial direction or a radial direction of the shaft when the shaft is rotated.

According to the present invention, it is possible to raise the reliability of the bearing, the bearing mechanism and the plunger pump.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be given of an embodiment of the present invention with reference to the accompanying drawings.

In the following, the basic principle of a plunger pump, an ABS (anti-lock braking system) device, and an ECB (electronic-control brake system) device, the hardware composition thereof, the principle of the operation thereof, and the fundamental control technique thereof are known to a person skilled in the art, and a description thereof will be omitted.

Figure 1:
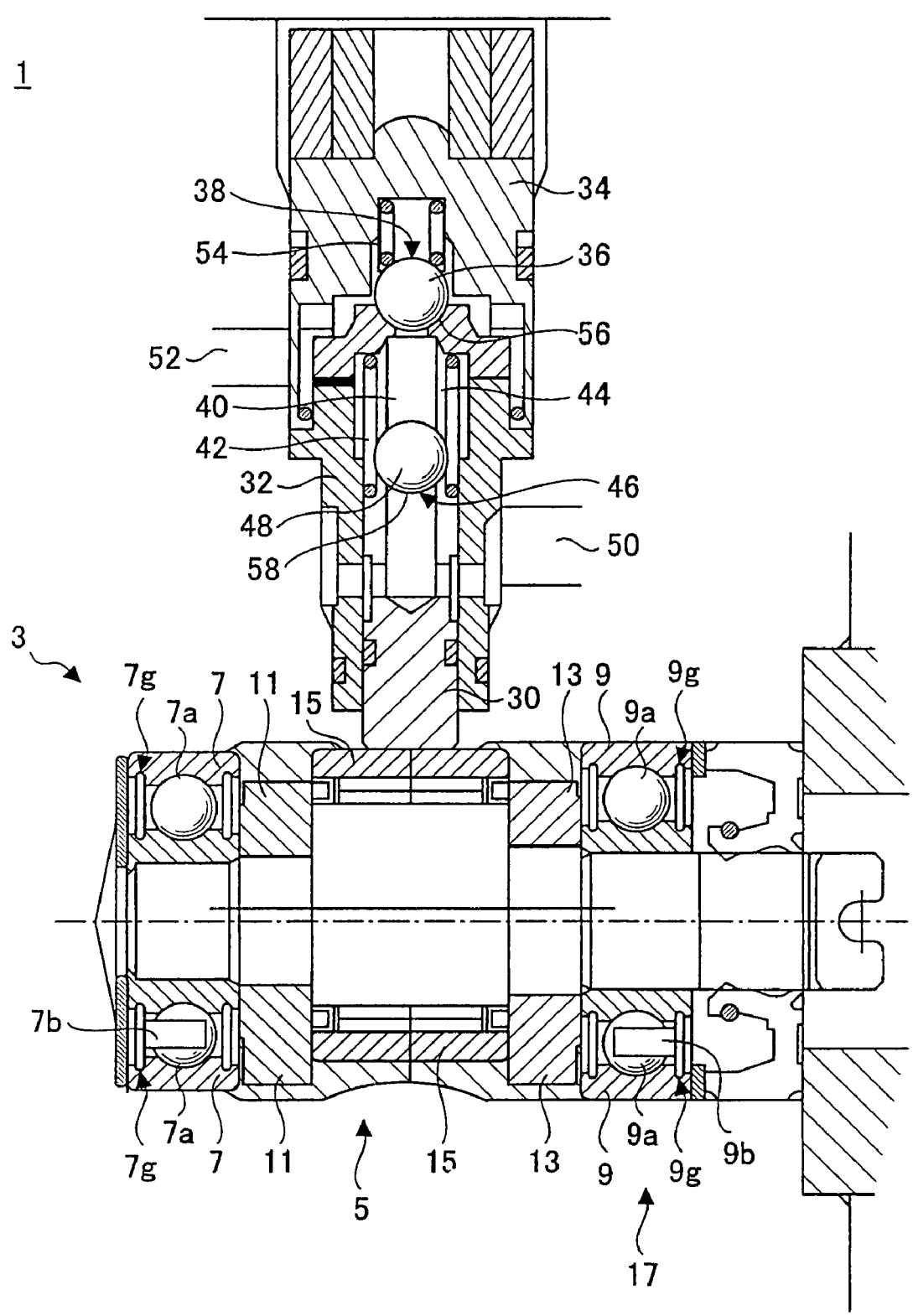
FIG. 1 is a cross-sectional view of the plunger pump in an embodiment of the invention.

FIG. 1 shows the composition of the plunger pump in an embodiment of the invention.

The plunger pump 1 in this embodiment is accommodated in a first housing 3 and comprises a shaft 5 which is connected to and driven by a drive shaft extending from a motor. The ends of the shaft 5 are supported by a first ball bearing 7 and a second ball bearing 9 so that the shaft 5 is freely rotatable.

A pair of a first balancer 11 and a second balancer 13 which are both in an annular configuration are disposed between the first ball bearing 7 and the second ball bearing 9 on the outer circumference of the shaft 5. The first balancer 11 and the second balancer 13 function as a counter weight which cancels the unbalance created with the eccentricity of the shaft 5 during rotation.

In this embodiment, the pair of annular balancers 11 and 13 are disposed on the outer circumference of the shaft 5. Alternatively, the number of balancers 11 and 13 disposed may be arbitrary.

A needle bearing 15 is disposed between the first balancer 11 and the second balancer 13 on the outer circumference of the shaft 5 such that the needle bearing 15 is eccentric with respect to the shaft 5. A plunger 30 is brought in contact with the outer circumference of the needle bearing 15.

In this embodiment, the needle bearing 15 is disposed on the outer circumference of the shaft 5. Alternatively, a ball bearing may be disposed instead. Moreover, in this embodiment, one plunger 30 is brought in contact with the outer circumference of the needle bearing 15. Alternatively, two or more plungers 30 may be brought in contact instead.

The plunger 30 is reciprocated in the radial direction of the shaft 5 when the needle bearing 15 which is eccentric to the shaft 5 is rotated. As mentioned above, the bearing mechanism 17 in this embodiment has a function as an eccentric cam mechanism.

The plunger 30 is fitted into a second housing 32 so that the plunger 30 can slide on the second housing 32. A third housing 34 has one end being fixed, and a ball 36 is disposed between the third housing 34 and the second housing 32, which forms a first discharge valve 38 therein.

A pump chamber 40 is formed between the plunger 30 and the second housing 32. In this pump chamber 40, springs 42 and 44 and a ball 48 are disposed, so that a suction valve 46 is formed in the pump chamber 40. The force of the spring 42 is exerted on the plunger 30 against the needle bearing 15.

Therefore, when the shaft 5 and the needle bearing 15 are rotated by a motor, the plunger 30 follows the eccentric motion of the needle bearing 15 according to the spring force of the spring 42, and the plunger 30 is reciprocated.

A suction passage 50 which communicates with a pressure source, such as a reservoir tank, and a discharge passage 52 where the oil (working fluid) pressurized in the pump chamber 40 is discharged are made to communicate with each other through the pump chamber 40.

The force of a spring 54 is exerted on the ball 36 against a valve seat 56 so that the ball 36 stays on the valve seat 54. The force of the spring 44 is exerted on the ball 48 against a valve seat 58 so that the ball 48 stays on the valve seat 58.

When the plunger 30 slides on the second housing 32 in the downward direction of FIG. 1 to increase the capacity of the pump chamber 40, the ball 48 is separated from the seat 58, against the spring force of the spring 44, by the negative pressure created in the pump chamber 40. Then, the oil from the suction passage 50 is fed into the pump chamber 40. At this time, the oil in the first housing 3 is fed into the pump chamber 40 through the suction passage 50.

On the other hand, when the plunger 30 slides on the second housing 32 in the upward direction of FIG. 1, the oil in the pump chamber 40 is pressurized, and the ball 36 is separated from the seat 56 against the spring force of the spring 54 by the pressurized oil pressure. Then, the pressurized oil in the pump chamber 40 is discharged to the discharge passage 52. At this time, the oil in the first housing 3 is discharged as the working fluid to the discharge passage 52 through the suction passage 50 and the pump chamber 40.

For example, when the plunger pump 1 is carried on a control brake device, such as ABS or ECB, the oil from the discharge passage 52 of the plunger pump 1 is used as the working fluid to drive the control brake device.

Next, each of the bearings 7, 9 and 15 and the balancers 11 and 13 will be explained.

Each of the first ball bearing 7 and the second ball bearing 9 has an inner race and an outer race. The inner race of each bearing is provided on the outer circumference of the shaft 5 and rotated integrally with the shaft 5. The outer race of each bearing is located on the circumferential surface of the inner race and supported by and fixed to the first housing 3.

A plurality of balls 7a and a plurality of balls 9a are held between the inner race and the outer race by a ball cage 7b and a ball cage 9b respectively, so that the balls 7a and 9a are freely rotatable around the circumference of the shaft 5.

The rolling elements of the ball bearings 7 and 9 are the balls 7a and the balls 9a, and the rolling-elements of the needle bearing 15 are needle rollers which will be described below.

Figure 2A:
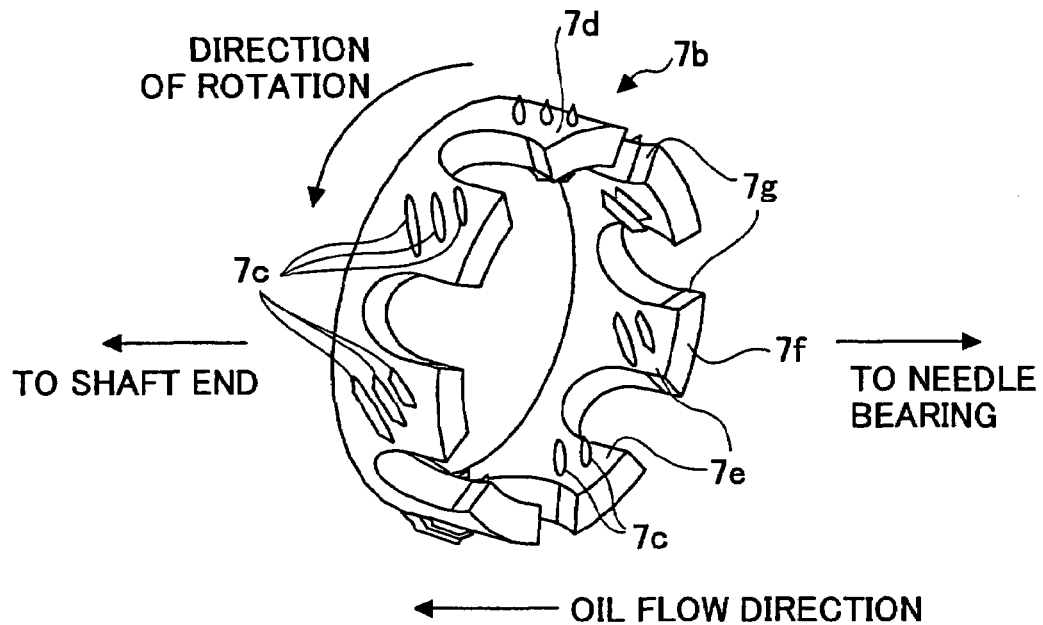
FIG. 2A is a diagram showing the composition of a ball cage of a first ball bearing.
Figure 2B:
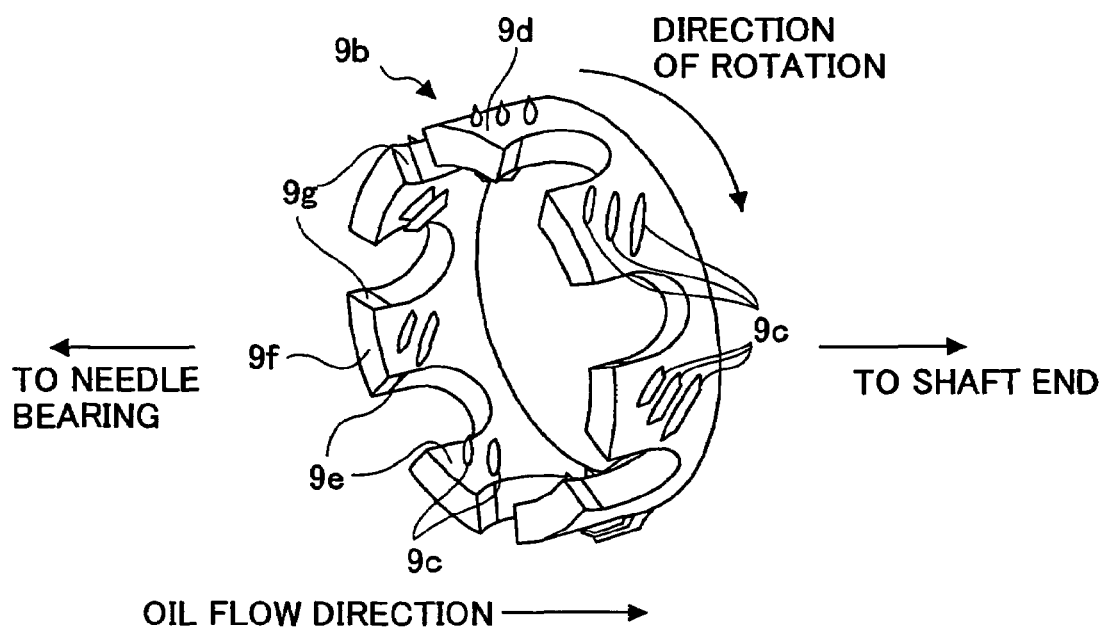
FIG. 2B is a diagram showing the composition of a ball cage of a second ball bearing.

FIG. 2A shows the ball cage 7b of the first ball bearing 7, and FIG. 2B shows the ball cage 9b of the second ball bearing 9.

As shown in FIG. 2A and FIG. 2B, each of the ball cages 7b and 9b is formed with a hollow opening extending in the axial direction of the shaft 5. The ball cages 7b and 9b are provided with the holding portion for holding the balls 7a and 9a, and the plurality of fin portions 7c and 9c which are formed on the outer circumferential surfaces 7d and 9d and on the inner circumferential surfaces 7e and 9e along the circumferential direction of the shaft 5.

In this embodiment, the ball cages 7b and 9b are arranged so that the openings of the ball cages 7b and 9b face the needle bearing 15. Alternatively, the ball cages 7b and 9b may be arranged so that the openings are directed reversely to the ends of the shaft 5 opposite to the needle bearing 15.

However, the oil flow resistance when the oil flows toward the ends of the shaft 5 (in the oil flow direction) in the case where the ball cages 7b and 9b are arranged so that the openings face the needle bearing 15 (as shown in FIG. 2A and FIG. 2B) is smaller than that in the case where the ball cages 7b and 9b are arranged so that the openings face the ends of the shaft 5. Therefore, according to this embodiment, the oil is efficiently fed toward the ends of the shaft 5, or in the direction to the left-hand end 7g of the first ball bearing 7 as indicated in FIG. 2A and in the direction to the right-hand end 9g of the second ball bearing 9 as indicated in FIG. 2B.

That is, according to this embodiment, it is possible to effectively reduce the negative pressure created at the ends of the shaft 5, which will be described later.

In addition, in the ball cages 7b and 9b, a plurality of through holes which penetrate the ball cages 7b and 9b in the axial direction of the shaft 5 may be formed. By this composition, it is possible to further reduce the oil flow resistance when the oil flows toward the ends of the shaft 5.

In the present embodiment, the fin portions 7c and 9c are formed on the outer circumferential surfaces 7d and 9d and the inner circumferential surfaces 7e and 9e of the ball cages 7b and 9b. Alternatively, the fin portions 7c and 9c may be formed on the end faces 7f and 9f and/or the side surfaces 7g and 9g of the ball cages 7b and 9b. Namely, as long as the fin portions 7c and 9c are formed at positions which do not bar the rotation of the balls 7a and 9a, they may be formed at any positions.

In the present embodiment, the fin portions 7c of the first ball bearing 7 may be formed in any arbitrary shape if the oil of the first ball bearing 7 can be fed in the axial direction of the shaft 5 toward the end of the shaft 5 (which direction is opposite to the needle bearing 15) by the rotation of the ball cage 7b around the shaft 5.

Similarly, the fin portions 9c of the second ball bearing 9 may be formed in any arbitrary shape if the oil of the second ball bearing 9 is fed in the axial direction of the shaft 5 toward the end of the shaft 5 (which direction is opposite to the needle bearing 15) by the rotation of the ball cage 9b around the shaft 5. The number of fin portions 7c formed on the ball cage 7b and the number of fin portions 9c formed on the ball cage 9b may be arbitrary.

Figure 3A:
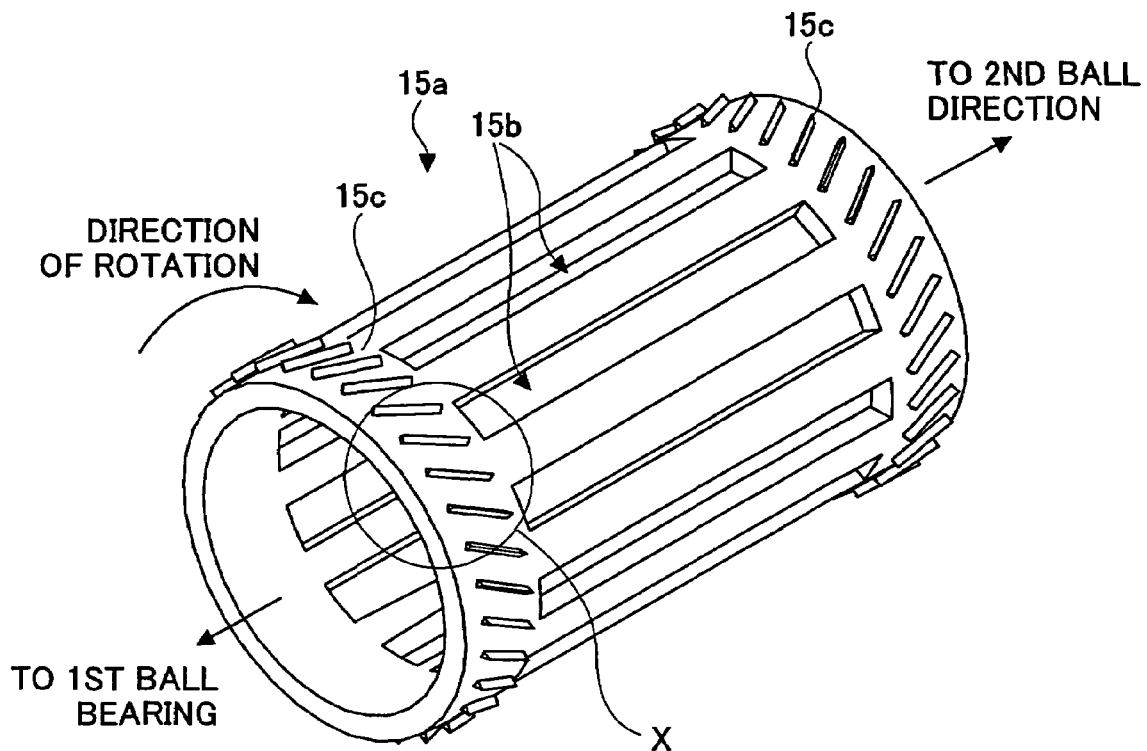
FIG. 3A is a diagram showing the composition of a roller cage of a needle bearing.
Figure 3B:
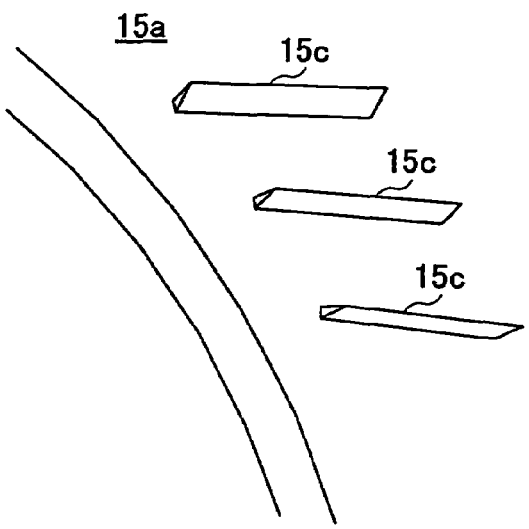
FIG. 3B is an enlarged diagram showing the composition of the portion of the roller cage indicated by the character X in FIG. 3A.

FIG. 3A shows the composition of the roller cage 15a of the needle bearing 15, and FIG. 3B is an enlarged diagram showing the composition of the portion of the roller cage 15a indicated by the character X in FIG. 3A.

As shown in FIG. 3A and FIG. 3B, the needle bearing 15 has the roller cage 15a which is formed in a cylindrical configuration with a plurality of roller accommodation holes 15b being drilled along the circumferential surface of the roller cage 15a.

The needle rollers are held in the roller accommodation holes 15b such that they project from the inner circumferential surface and the outer circumferential surface of the roller cage 15a and they are rotatable. The roller cage 15a is provided so that the projection amount of the needle rollers on the circumferential surface is larger than the projection amount of the needle rollers on the inner circumferential surface (inside surface guidance).

As shown in FIG. 3B, a plurality of convex portion 15c are formed on both the ends of the circumferential surface of the roller cage 15a along the circumferential direction thereof. The convex portions 15c are formed in a straight-line shape and slanted to the axial direction of the shaft 5.

The convex portions 15c at the left-hand end of the roller cage 15a are slanted in a clockwise direction with respect to the plane parallel to the axis of the rotary shaft 5, and the convex portions 15c at the right-hand end of the roller cage are slanted in a counterclockwise direction with respect to the plane parallel to the axis of the rotary shaft 5.

In the embodiment of FIG. 3B, the convex portions 15c formed at the end of the circumferential surface of the roller cage 15a have a triangular cross-section. Alternatively, the convex portions 15c may be formed to have a cross section of any arbitrary shape.

Moreover, the convex portions 15c may be formed on the middle circumferential surface of the roller cage 15a between two adjacent ones of the roller accommodation holes 15b. That is, the convex portions 15c may be formed in any shape and at any locations, if they serve to feed the oil on the outer circumferential surface of the roller cage 15a into the inside direction (to the inner circumferential surface) of the roller cage 15a when the roller cage 15a is rotated around the shaft 5. For example, the shape of the convex portion 15c may be a streamline shape, a fin-like shape, or a plate-like shape.

In the present embodiment, the projection amount of the needle rollers on the outer circumferential surface is larger than the projection amount of the needle rollers on the inner circumferential surface (inside surface guidance). Alternatively, the projection amount of the needle rollers on the inner circumferential surface may be larger than the projection amount of the needle rollers on the outer circumferential surface (outside surface guidance). In such alternative embodiment, the convex portions 15c are formed at the ends of the inner circumferential surface of the roller cage 15a. In this case, the shape of the convex portions 15c is formed so that the oil of the inner circumferential surface of the needle bearing 15 is fed in the inward, axial direction of the shaft 5.

Alternatively, the projection amount of the needle rollers on the outer circumferential surface may be made to be substantially equal to the projection amount of the needle rollers on the inner circumferential surface (roller guidance). In such alternative embodiment, the convex portions 15c are formed at the ends of the inner circumferential surface of the roller cage 15a and at the ends of the outer circumferential surface thereof.

Figure 4:
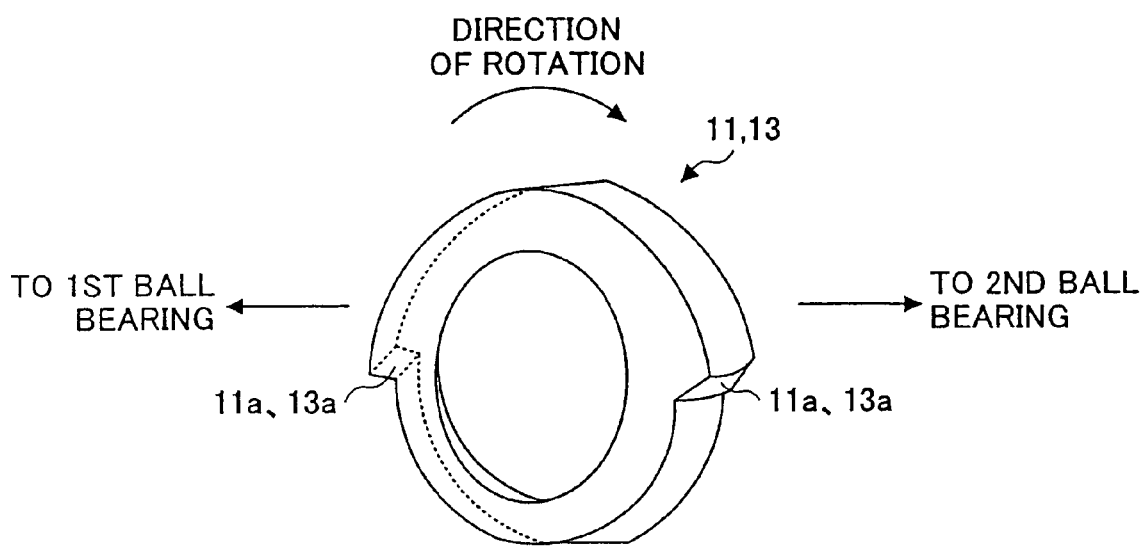
FIG. 4 is a diagram showing the composition of a first balancer or a second balancer.

FIG. 4 shows the composition of the first balancer 11 or the second balancer 13.

As shown in FIG. 4, a pair of fin portions 11a and a pair of fin portions 13a are formed in the first balancer 11 and the second balancer 13, respectively.

The fin portions 11a and 13a of the first balancer 11 and the second balancer 13 are configured into a curved surface such that the oil at the ends of the balancer weight is fed in the axial direction of the shaft 5.

For example, the fin portions 11a and 13a of the first balancer 11 and the second balancer 13 may be formed so that the both ends of the balancer weight are slanted.

The fin portions 11a of the first balancer 11 may be formed in any shape, if the oil is fed in the direction to the first ball bearing 7 when the first balancer 11 is rotated around the shaft 5. Similarly, the fin portions 13a of the second balancer 13 may be formed in any shape, if the oil is fed in the direction to the second ball bearing 9 when the second balancer 13 is rotated around the shaft 5.

Moreover, the fin portions 11a and 13a may be formed at arbitrary positions in the first balancer 11 and the second balancer 13.

Next, the method of reducing the negative pressure in the bearings 7, 9 and 15 will be explained.

Figure 5:
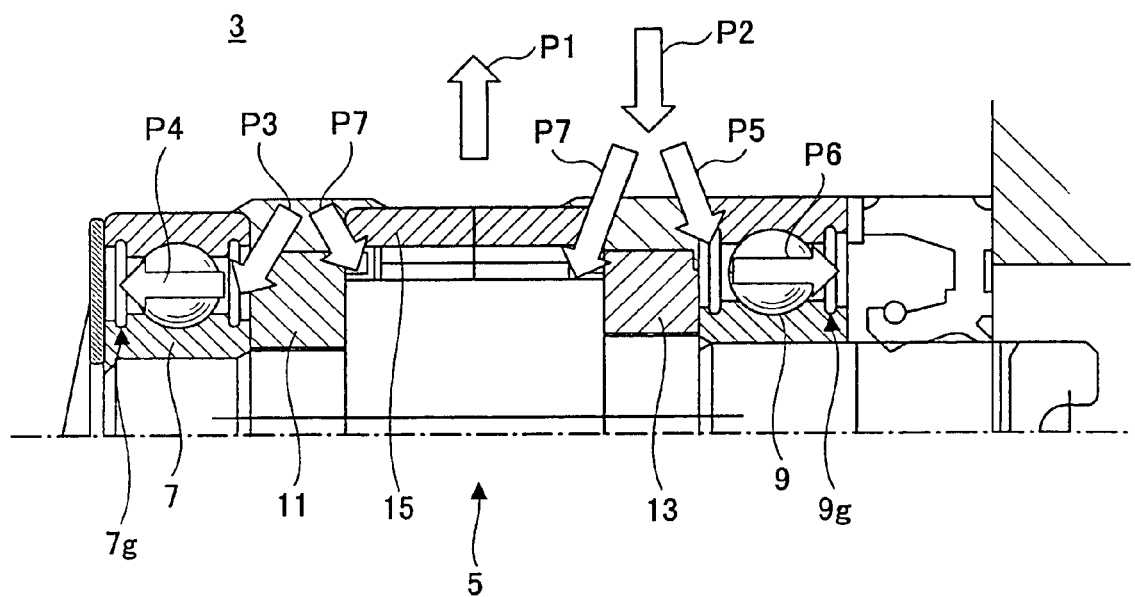
FIG. 5 is a cross-sectional view of a bearing mechanism in which the direction of flow of the oil in the bearing mechanism is indicated.

FIG. 5 is a cross-sectional view of the bearing mechanism 17 in which the direction of flow of the oil in the bearing mechanism is indicated.

When the shaft 5 is rotated by the motor, the plunger 30 is reciprocated and the oil in the first housing 3 flows out through the suction passage 50 (P1).

When the oil flows out of the shaft 5 (P1), a negative pressure arises in the shaft 5 in the first housing 3.

When the shaft 5 is further rotated, the oil is flown to the outside of the shaft 5 by the centrifugal force, and a negative pressure arises on the outer circumference of the shaft 5 (on the inner circumference of the bearing).

The oil from the suction passage is fed to the shaft 5 in the first housing 3 due to the suction action of the negative pressure (P2).

The oil fed to the shaft 5 is partially fed to the first ball bearing 7 by the action of the fin portions 11a of the first balancer 11 (P3).

The oil fed by the fin portions 11a is further fed in the axial direction of the shaft 5 by the action of the fin portions 7c of the ball cage 7b of the first ball bearing 7 (P4).

Similarly, the oil fed to the shaft 5 in the first housing 3 is partially fed to the second ball bearing 9 by the action of the fin portions 13a of the second balancer 13 (P5).

The oil fed by the fin portions 13a is further fed in the axial direction of the shaft 5 by the action of the fin portions 9c of the ball cage 9b of the second ball bearing 9 (P6).

The oil fed in the axial direction of the shaft 5 reduces the negative pressure created in the range between the center and the inside diameter portion of the first ball bearing 7 and the second ball bearing 9 while lubricating the portions around the center of the balls 7a and 9a of the first ball bearing 7 and the second ball bearing 9.

In this respect, the negative pressure at the left-hand end 7g of the first ball bearing 7 and the negative pressure at the right-hand end 9g of the second ball bearing 9 are comparatively high.

As previously described, by the action of the fin portions 11a and 13a of the balancers 11 and 13 and the fin portions 7c and 9c of the ball cages 7b and 9b of the ball bearings 7 and 9, the oil is fed in the axial direction of the shaft 5, and the thus fed oil arrives at the left-hand end 7g of the first ball bearing 7 and the right-hand end 9g of the second ball bearing 9 where the negative pressure is comparatively high.

Accordingly, the negative pressure at the left-hand end 7g of the first ball bearing 7 and at the right-hand end 9g of the second ball bearing 9 can be reduced effectively.

Moreover, the oil fed from the suction passage to the shaft 5 partially flows from the ends of the needle bearing 15 to the inner circumference side of the needle bearing 15 (P7).

The centrifugal force is exerted on the oil inside the needle bearing 15 in the radial direction of the shaft 5 so that the oil is partially fed from the inside to the outside of the needle bearing 15. The oil, partially fed out at this time, is put back to the inside of the needle bearing 15 by the presence of the convex portions 15c formed on the outer circumference of the roller cage 15a at the ends thereof.

Namely, the negative pressure created in the needle bearing 15 when the oil is fed from the inside to the outside of the needle bearing 15 by the centrifugal force can be reduced by the put-back action of the convex portions 15c on the roller cage 15a.

As described above, occurrence of air bubbles in the oil can be suppressed by reducing the negative pressure created in each of the first ball bearing 7, the second ball bearing 9, and the needle bearing 15.

Therefore, reduction of the oil film thickness of the bearings 7, 9 and 15 is suppressed, and overheating, baking, etc. of the bearings 7, 9 and 15 can be prevented.

Accordingly, the durability of each of the bearings 7, 9 and 15 can improve, and the reliability of the bearings 7, 9 and 15 and the bearing mechanism 17 can be raised.

Furthermore, when the plunger pump 1 of this embodiment is carried on a control brake device, such as ABS or ECB, or a traction control device, occurrence of air bubbles in the oil can be suppressed, and mixture of air bubbles with the working fluid of the device through the suction passage 50 can be prevented.

Accordingly, the operational stability of the ABS or ECB device and the traction control device improves, and the reliability thereof improves.

The present invention is not limited to the above-described embodiments, and variations and modifications may be made without departing from the scope of the present invention.

For example, in the above-mentioned embodiment, the bearing is constituted by the ball bearing and the needle bearing. However, the present invention is applicable to any types of bearings, such as an axial bearing, a roller bearing, a thrust bearing, and a radial bearing.

The bearing device of the invention can be used for the bearing and bearing mechanism of a plunger pump which is adopted for a control brake device, such as ABS or ECB, and a traction control device. The appearance, weight, size, running performance, etc. of the vehicle on which the bearing device is carried may be arbitrary.

Further, the present application is based upon and claims the benefit of priority from Japanese patent application No. 2004-351227, filed on Dec. 3, 2004, the entire contents of which are incorporated herein by reference.

What is claimed is:

1. A bearing mechanism including a shaft provided in a housing, a bearing provided on the shaft, and a rotating member provided on the shaft, wherein the bearing comprising:

a cage provided between an outer race and the shaft to hold rolling elements which are rotatable in an oil around the shaft; and a guide unit provided on the cage and/or the rotating member to feed the oil of the bearing in an axial direction or a radial direction of the shaft when the shaft is rotated wherein the rotating member is a balancer which comprises first convex portions provided thereon to feed the oil in a direction toward the bearing when the shaft is rotated.

2. The bearing mechanism according to claim 1, further comprising a second bearing with a second cage, the second cage comprises second convex portions provided on the second cage to feed the oil in the axial direction or the radial direction of the shaft when the shaft is rotated.

3. The bearing mechanism according claim 1 wherein the bearing is a ball bearing or a needle bearing.

4. The bearing mechanism according to claim 1 wherein a pair of ball bearings are disposed on the circumference of the shaft at both ends of the shaft, a pair of balancers are disposed between the pair of ball bearings on the circumference of the shaft, and a needle bearing is disposed between the pair of balancers on the circumference of the shaft.

5. A plunger pump including a plunger, a bearing mechanism, and a pump chamber, the bearing mechanism including a shaft provided in a housing, a first bearing and a second bearing provided on the shaft, and a rotating member provided on the shaft, the plunger being brought in contact with the second bearing and reciprocated with an eccentricity of the second bearing to suck an oil from a suction passage into the pump chamber and discharge the oil of the pump chamber to a discharge passage by the reciprocating motion of the plunger, wherein the bearing mechanism comprises:

a cage provided between an outer race and the shaft to hold rolling elements which are rotatable in an oil around the shaft; and a guide unit provided on the cage and/or the rotating member to feed the oil of the first bearing in an axial direction or a radial direction of the shaft when the shaft is rotated wherein the rotating member is a balancer which comprises convex portions provided thereon to feed the oil in a direction toward the bearing when the shaft is rotated.

* * * * *